United States Patent [19]

Suzuki et al.

[11] Patent Number: 5,172,223
[45] Date of Patent: Dec. 15, 1992

[54] METHOD OF PROCESSING A COLOR IMAGE TO OBTAIN COLOR AND BLACK REPRODUCTION SIGNALS

[75] Inventors: Akio Suzuki, Yokohama; Yoshihiro Takada, Kawasaki; Masami Izumizaki, Tokyo, all of Japan

[73] Assignee: Canon Kabushiki Kaisha, Tokyo, Japan

[21] Appl. No.: 754,379

[22] Filed: Aug. 30, 1991

Related U.S. Application Data

[63] Continuation of Ser. No. 290,642, Dec. 27, 1988, abandoned.

[30] Foreign Application Priority Data

Dec. 29, 1987 [JP] Japan .................................. 62-334791

[51] Int. Cl.$^5$ ............................................. H04N 1/46
[52] U.S. Cl. .................................................. 358/79; 358/80
[58] Field of Search ............... 358/75, 79, 80, 296, 358/443; 346/140 R

[56] References Cited

U.S. PATENT DOCUMENTS

| | | | |
|---|---|---|---|
| 4,482,917 | 11/1984 | Gaulke et al. | 358/75 |
| 4,590,515 | 5/1986 | Wellendorf | 358/75 |
| 4,614,967 | 9/1986 | Sayanagi | 358/75 |
| 4,636,844 | 1/1987 | Sasaki | 358/75 |
| 4,682,216 | 7/1987 | Sasaki et al. | 358/79 |
| 4,772,911 | 9/1988 | Sasaki et al. | 358/296 |
| 4,785,347 | 11/1988 | Ezuka et al. | 358/75 |
| 4,829,323 | 5/1989 | Suzuki et al. | 346/140 R |
| 4,853,768 | 8/1989 | Suzuki et al. | 358/80 |
| 4,855,765 | 8/1989 | Suzuki et al. | 346/154 |
| 4,882,621 | 11/1989 | Suzuki et al. | 358/80 |
| 4,965,664 | 10/1990 | Udagawa et al. | 358/80 |

FOREIGN PATENT DOCUMENTS

| | | |
|---|---|---|
| 0266186 | 5/1988 | European Pat. Off. . |
| 0267566 | 5/1988 | European Pat. Off. . |
| 3313392 | 10/1983 | Fed. Rep. of Germany . |
| 0163974 | 9/1984 | Japan .................................. 358/80 |
| 0050153 | 3/1986 | Japan .................................. 358/80 |
| 63-042576 | 2/1988 | Japan . |
| 2119600 | 11/1983 | United Kingdom . |
| 2202708 | 9/1988 | United Kingdom . |

*Primary Examiner*—Edward L. Coles, Sr.
*Assistant Examiner*—Kim Yen Vu
*Attorney, Agent, or Firm*—Fitzpatrick, Cella, Harper & Scinto

[57] ABSTRACT

According to a method and apparatus for processing a color image, three primary color signals are input, and the input three primary color signals are processed to obtain three color reproduction signals and a black reproduction signal. In order to obtain the black reproduction signal, a value corresponding to a minimum value of the three primary color signals is obtained, and the value is transformed by a continuous function having a downwardly convex shape, thereby defining a transformed value as the black reproduction signal.

39 Claims, 9 Drawing Sheets

METHOD OF PROCESSING A COLOR IMAGE TO OBTAIN COLOR AND BLACK REPRODUCTION SIGNALS

This application is a continuation of application Ser. No. 07/290,642 filed Dec. 27, 1988, now abandoned.

BACKGROUND OF THE INVENTION:

1. Field of the Invention

The present invention relates to a method of processing a color image and an apparatus therefor.

2. Related Background Art

In a conventional color image forming system, primary color signals, e.g., Y, M, and C signals obtained by reading a color image are processed, the processed signals are subjected to UCR (Under Color Removal) to obtain Y, M, and C signals for printing colors on a recording medium and the Bk (black) signal obtained by multiplying a minimum value of the Y, M, and C signals with a predetermined ratio, and a color image is formed as a visible image on a recording medium such as paper by using Y, M, C, and Bk inks.

However, when a UCR amount or an inking amount is increased, a saturation level of a portion having a low density, i.e., a bright portion is degraded, and image quality is degraded. For this reason, a balancing point among a maximum saturation level of a low density, a "solid" black area in a high-density portion, and ink offset (transfer of an ink to an object except for the recording medium) must be found to determine a UCR amount and an inking amount.

In order to cope with these problems, a journal of the Institute of Electrophotography, vol. 24, PP. 60-67 describes a technique wherein a threshold value is set for a UCR amount, and UCR and inking operations are not performed until a minimum value $K_0$ of the Y, M, and C signals exceeds a threshold value T. UCR and inking operations are performed only when the minimum value $K_0$ exceeds the threshold value T.

In processing using such a threshold value T, in order to obtain a maximum black ink amount in a high-density portion and eliminate offset, a gamma correction level of a black signal must be set at a higher level (dotted line (2) in FIG. 4) as compared with a case wherein the threshold value T is not given as indicated by a solid line (1) in FIG. 4. A black ink amount is plotted along the ordinate of FIG. 4, while the minimum value $K_0$ is plotted along the L abscissa When the minimum value $K_0$ = min(C,M,Y) exceeds the threshold value T, an amount of black ink is abruptly increased, and printing is started. Black has a higher contrast level than those of cyan, magenta, and yellow when these colors are visually observed. A start black portion upon printing tends to be typically noticed as compared with the remaining black portion, as if a pseudo edge is present between the start black portion and the remaining black portion. For this reason, the UCR amount and the inking amount cannot be sufficiently increased in this method.

SUMMARY OF THE INVENTION

It is a principal object of the present invention to eliminate some or all the conventional problems described above.

It is another object of the present invention to provide a method of processing a color image and an apparatus therefor, wherein a decrease in saturation level in a low-density portion and the pseudo edge formed by the threshold value are perfectly eliminated, and a good color image can be reproduced.

According to an aspect of the present invention, there is provided a method of processing a color image, comprising the steps of operating primary color signals obtained by reading the color image to obtain three-color reproduction signals and a black reproduction signal to reproduce the color image by using these reproduction signals, wherein a given value corresponding to a minimum value of the primary color signals and a value obtained by converting the given value by a continuous function having a minimum peak are used as the black reproduction signal.

It is still another object of the present invention to provide an image processing apparatus capable of performing good image recording in a serial scan type printer and a method thereof.

It is still another object of the present invention to provide a method of processing an image and an apparatus therefor wherein good image recording is performed in an ink-jet type printer.

It is still another object of the present invention to provide an image processing apparatus and a method thereof wherein good image recording can be performed on a recording medium (e.g., a back-print film) having a low ink retaining capacity.

The above and other objects, features, and advantages of the present invention will be apparent from the following detailed description of preferred embodiments in conjunction with the accompanying drawings.

DETAILED DESCRIPTION OF THE PREFERRED EMBODIMENTS

Preferred embodiments of the present invention will be described with reference to the accompanying drawings.

Figure 1:
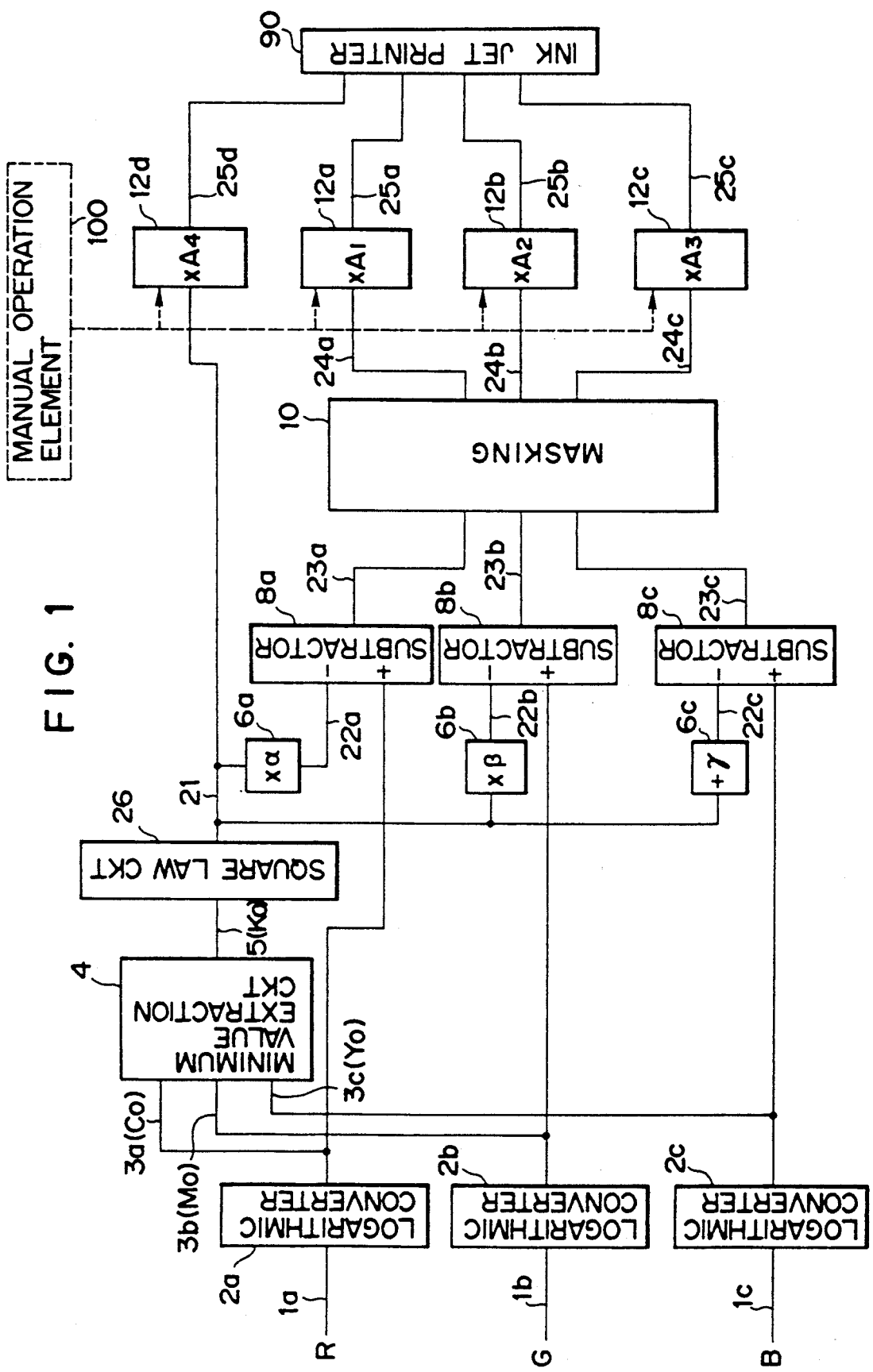
FIG. 1 is a block diagram of a color image processing apparatus according to the present invention.

FIG. 1 is a block diagram of a color image processing apparatus according to a first embodiment of the present invention. Red, green, and blue input signals $1a$, $1b$, and $1c$ are converted into density signals $3a$, $3b$, and $3c$ by logarithmic converters $2a$, $2b$, and $2c$, respectively. The density signal $3a$ is a cyan density signal; $3b$, a magenta density signal; and $3c$, a yellow density signal. A minimum value $K_0$ of the cyan, magenta, and yellow signals is extracted by a minimum value extraction circuit 4 and is output as a signal 5. The minimum value is extracted as follows:

$$K_0 = \min(C_0, M_0, Y_0) \tag{1}$$

where $C_0$ is the cyan density signal $3a$, $M_0$ is the magenta density signal $3b$, and $Y_0$ is the yellow density signal $3c$.

The signal 5 is converted into $K_0^2$ by a square law circuit 26. The square law circuit 26 may be a multiplier or a ROM. The $K_0^2$ output is multiplied with $\alpha$, $\beta$, and $\gamma$ by multipliers $6a$ to $6c$. Outputs from the multipliers $6a$ to $6c$ are input to the inverting input terminals of subtractors $8a$ to $8c$, respectively. The signals $3a$ to $3c$ are input to the noninverting input terminals of the subtractors $8a$ to $8c$, respectively.

If outputs $23a$ to $23c$ from the subtractors $8a$ to $8c$ are represented by $C_1$, $M_1$, and $Y_1$, respectively, they are given by:

$$C_1 = C_0 - \alpha K_0^2 \tag{2}$$

$$M_1 = M_0 - \beta K_0^2 \tag{3}$$

$$Y_1 = Y_0 - \gamma K_0^2 \tag{4}$$

The outputs ($C_1$, $M_1$, and $Y_1$) from the subtractors $8a$ to $8c$ are input to a masking processor 10. The masking processor 10 performs color correction of the $C_1$, $M_1$, and $Y_1$ components as follows:

$$C_2 = a_{11}C_1 + a_{12}M_1 + a_{13}Y_1 \tag{5}$$

$$M_2 = a_{21}C_1 + a_{22}M_1 + a_{23}Y_1 \tag{6}$$

$$Y_2 = a_{31}C_1 + a_{32}M_1 + a_{33}Y_1 \tag{7}$$

Signals $24a$, $24b$, and $24c$ (i.e., $C_2$, $M_2$, and $Y_2$) output from the masking processor 10 are input to gamma correction circuits $12a$ to $12c$ and are multiplied with coefficients $A_1$, $A_2$, and $A_3$, respectively. Outputs from the gamma correction circuits $12a$ to $12c$ appear as image recording signals $25a$ to $25c$. If the signals $25a$ to $25c$ are represented by $C_3$, $M_3$, and $Y_3$, they are given by:

$$C_3 = A_1 \times C_2 \tag{8}$$

$$M_3 = A_2 \times M_2 \tag{9}$$

$$Y_3 = A_3 \times Y_2 \tag{10}$$

The signal 5 extracted by the minimum value extraction circuit 4 is multiplied with $A_4$ by the gamma correction circuit $12d$, and the product is output as a black signal $25d$. This black signal $25d$ is represented by $K_1$ which is given by:

$$K_1 = A_4 \times K_0^2 \tag{11}$$

The $C_3$, $M_3$, $Y_3$, and $K_1$ signals serve as cyan, magenta, yellow, and black image signals, respectively, and an image is formed at the ink-jet printer, thereby reproducing a full-color image.

An operation by equation (1) is called black extraction, and operations by equations (2) and (3) are called UCR, and an operation by equation (11) is called inking.

An arrangement of the ink-jet printer 90 used in this embodiment will be described below.

Figure 5:
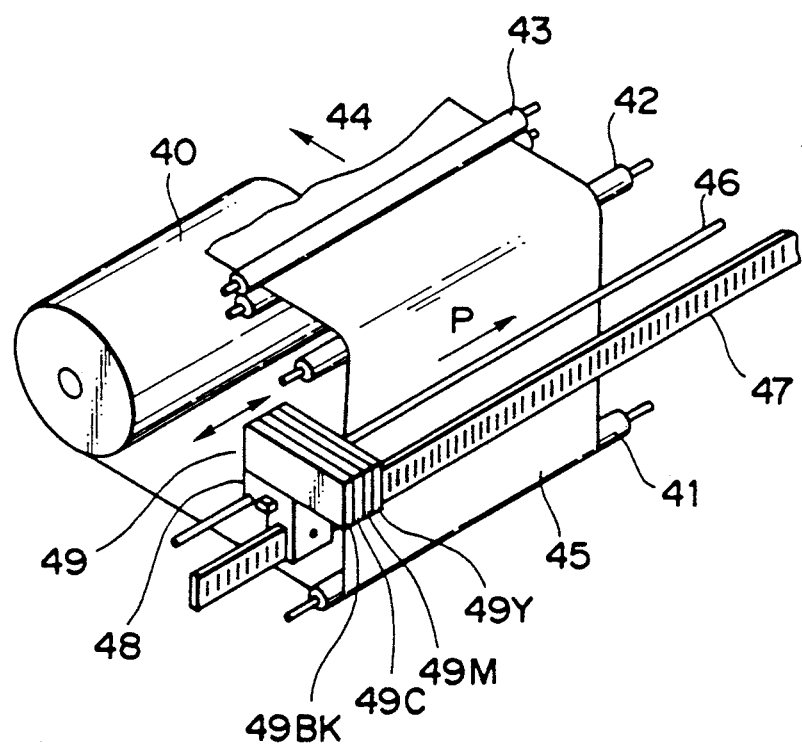
FIG. 5 is a schematic perspective view of an ink-jet printer 90.

FIG. 5 is a schematic perspective view of the ink-jet printer 90.

Referring to FIG. 5, a recording medium 45 drawn from a roll of recording medium 40 is clamped between feed rollers 43 through convey rollers 41 and 42 and is fed in a direction of an arrow 44. Guide rails 46 and 47 are parallel to each other so as to cross the recording medium 40. A recording head unit 49 mounted on a carriage 48 is reciprocated. Yellow, magenta, cyan, and black heads 49Y, 49M, 49C, and 49Bk are mounted on the carriage 48. Yellow, magenta, cyan, and black ink tanks are connected to these heads 49Y, 49M, 49C, and 49Bk, respectively. The recording medium 45 is intermittently fed by a printing width of each recording head 49. The recording heads 49 are moved in a direction of an arrow P, while the recording medium 45 is kept stopped, thereby injecting ink drops corresponding to an image signal.

Figure 2:
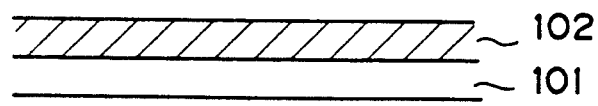
FIGS. 2 and 3 are sectional views of recording media used.

The recording medium consists of paper or any other material. As shown in FIG. 2, the recording medium may be a so-called back-print film comprising a transparent substrate 101 and an ink absorbing layer 102. An ink is injected from the side of the ink absorbing layer 102, and an image is observed from the side of the transparent substrate 101. Since an image is observed from the transparent substrate side in the back-print film, an image density can be increased, and a portion of the ink absorbing layer which is exposed to outer air can be reduced, thereby preventing bleaching. The back-print film has a low ink retaining capacity. In particular, an image may be degraded in ink-jet recording. According to the image processing method of the present invention, image degradation can be minimized or eliminated.

Figure 6A:
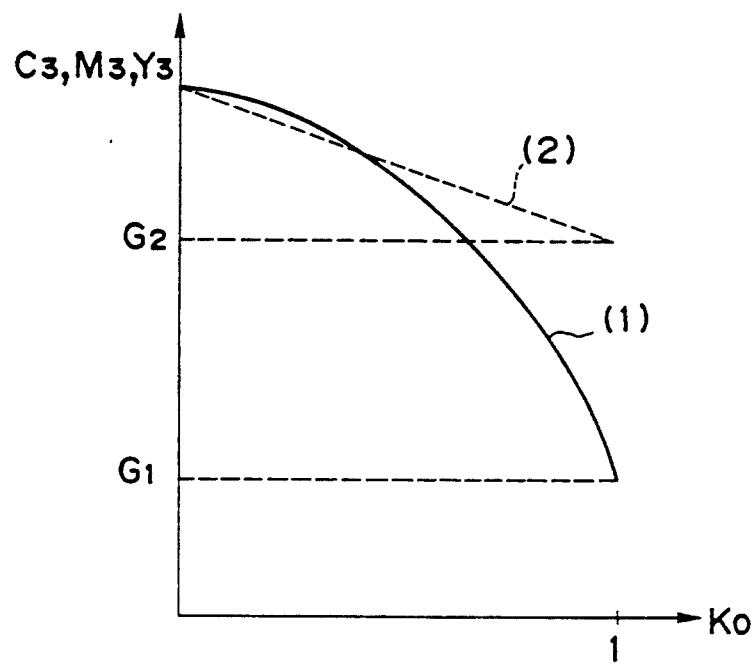
FIG. 6A is a graph showing a UCR operation of the present invention and a conventional UCR operation.
Figure 6B:
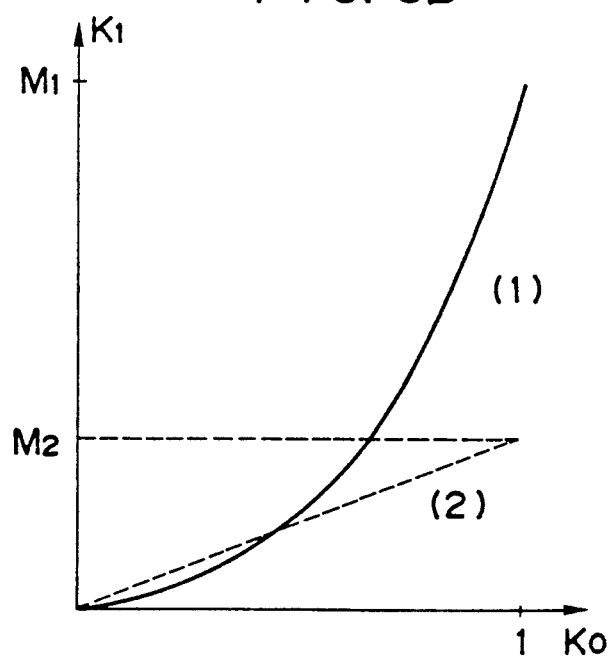
FIG. 6B is a graph showing an inking operation of the present invention and a conventional inking operation.

Since the above-mentioned image processing is performed in this embodiment, the amounts of the cyan (C), magenta (M), and yellow (Y) image recording signals are represented by a curve (1) in FIG. 6A, while the amount of the black image recording signal is represented by a curve (1) in FIG. 6B. The Y, M, and C ink amounts are plotted along the abscissa in FIG. 6A, while the minimum value $K_0$ is plotted along the ordinate. According to the conventional UCR technique, a UCR amount indicated by a line (2) in FIG. 6A cannot be greatly increased so as to prevent a decrease in saturation level in a low-density portion. Therefore, the color ink amounts can be reduced to only a level $G_2$. However, according to this embodiment, the minimum value $K_0$ is squared by the square law circuit 26, and therefore, the color ink amounts can be reduced to a level $G_1$ in FIG. 6A.

In order to prevent a decrease in saturation level in a low-density portion during inking, an operation must be performed, as indicated by a curve (2) in FIG. 6B. Therefore, the black ink is added up to only a level $M_2$ even for a maximum density. However, according to this embodiment, the amount of black ink can be increased up to a level $M_1$ in FIG. 6B. The amount of black ink is plotted along the ordinate in FIG. 6B, while the minimum value $K_0$ is plotted along the abscissa.

A characteristic curve for the black ink amount has a small gradient in a low-density portion. When the density of the image is increased, this gradient is increased. An increase in amount of black ink used at the start of printing in a low-density portion can be small, and a pseudo edge tends not to appear.

In this embodiment, the UCR amount and the inking amount are represented by quadratic functions to obtain optimal UCR and inking amount without causing a decrease in saturation level in the low-density portion and occurrence of a pseudo edge. In addition, a total amount of ink to be used can be minimized, and high-quality full-color image recording can be performed without causing ink blurring, offset of the ink from the recording medium to a medium convey member, and stripes formed between scanning cycles.

The back-print film having the structure shown in FIG. 2 has various advantages described above. However, when an amount of ink is increased, "blurring" tends to occur due to a relatively small thickness of the ink absorbing layer. Since a total amount of ink can be reduced in this embodiment, "blurring" can be effectively prevented. In order to obtain a better effect, when a back-print film is used, a back-print film designation signal is input from a manual operation element 100 indicated by a broken block in FIG. 1, and the mode of operation of the gamma correction circuits 12a, 12b, 12c, and 12d may be changed. Alternatively, the mode of operation of the square law circuit 26 may be changed.

A second embodiment of the present invention will be described below.

Figure 7:
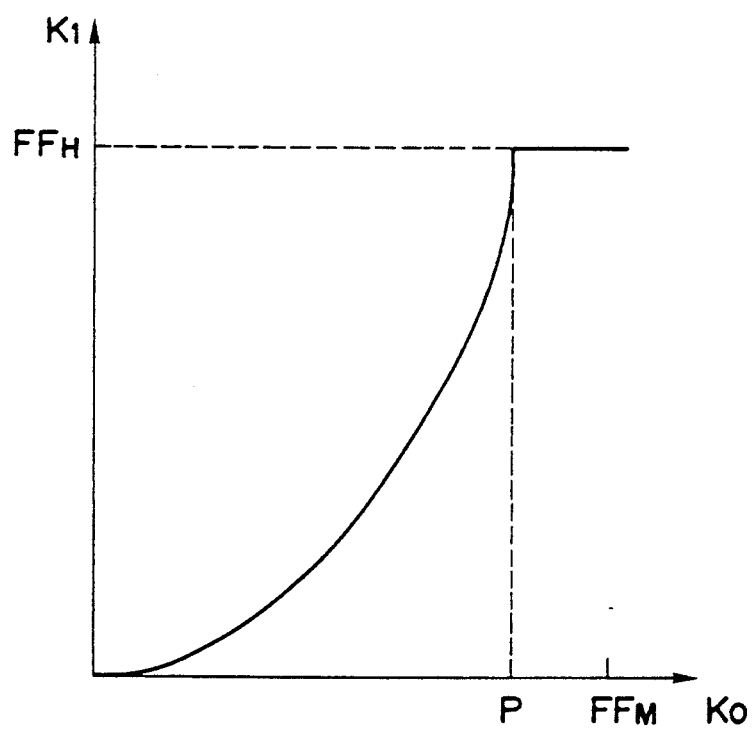
FIG. 7 is a graph showing an inking operation according to a first embodiment of the present invention.

In the first embodiment, the UCR and inking amounts are represented by quadratic functions. In this case, when a gamma correction amount $A_4$ of the black image signal is increased, the gradation of the black components in the high-density portion is undesirably lost, as shown in FIG. 7. Gamma-converted minimum values $K_1$ are plotted along the ordinate in FIG. 7, while the minimum values $K_0$ before gamma conversion are plotted along the abscissa. Gamma conversion is performed using an 8-bit signal. In order to improve "solidity" of the black area in the intermediate- and high-density portions, when the value $A_4$ multiplied by the gamma correction circuit is increased, a black value is saturated to be $FF_H$ in the area of a density higher than P. In other words, the gradation of the black components cannot be expressed in the range of $P \leq K_0 \leq FF_H$.

The second embodiment provides an improvement in view of this drawback. UCR and inking amounts are represented by cubic functions.

Figure 8:
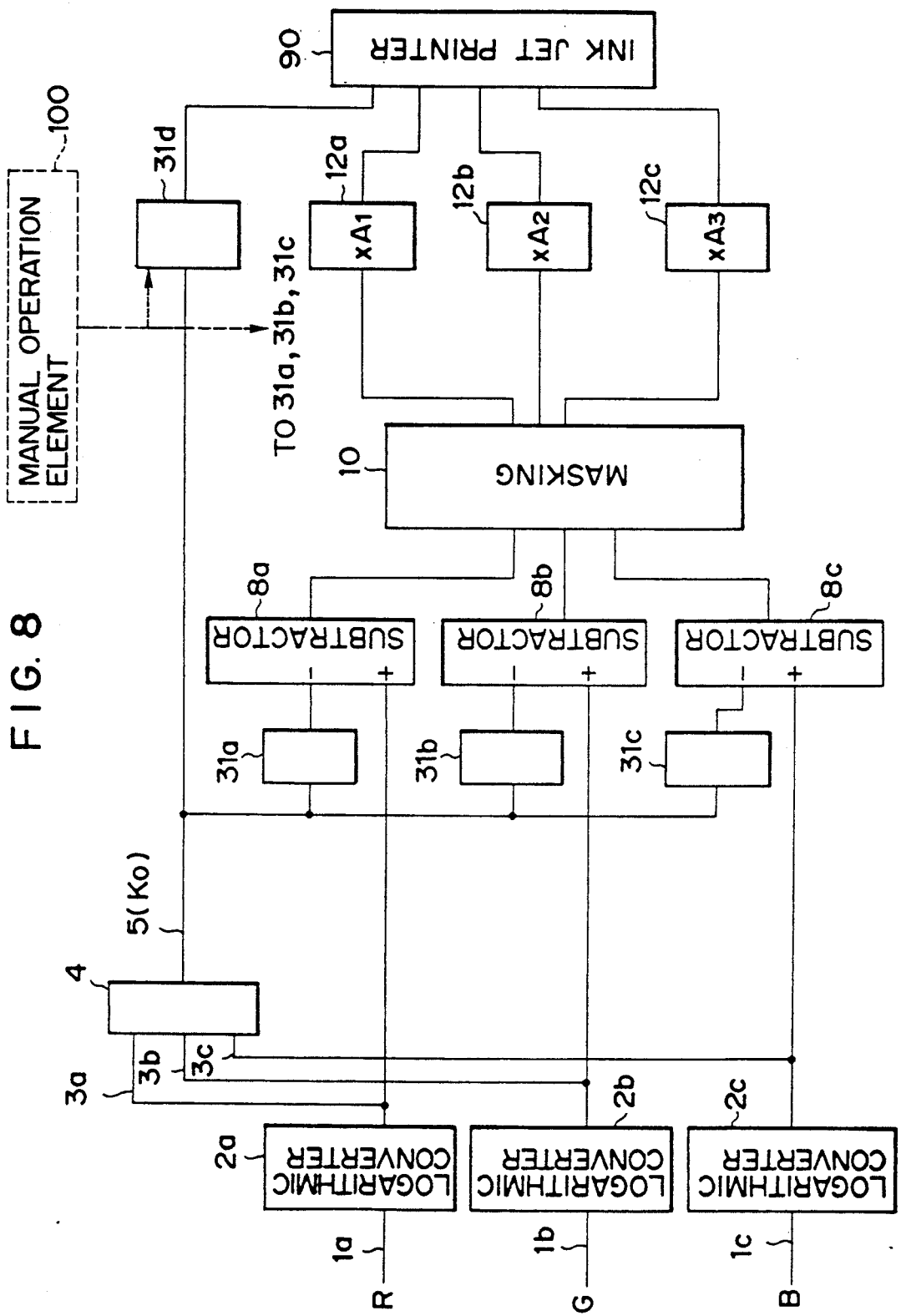
FIG. 8 is a block diagram showing a second embodiment of the present invention.

A circuit arrangement of the second embodiment is shown in FIG. 8. The same reference numerals as in FIG. 1 denote the same parts in FIG. 8.

Figure 9:
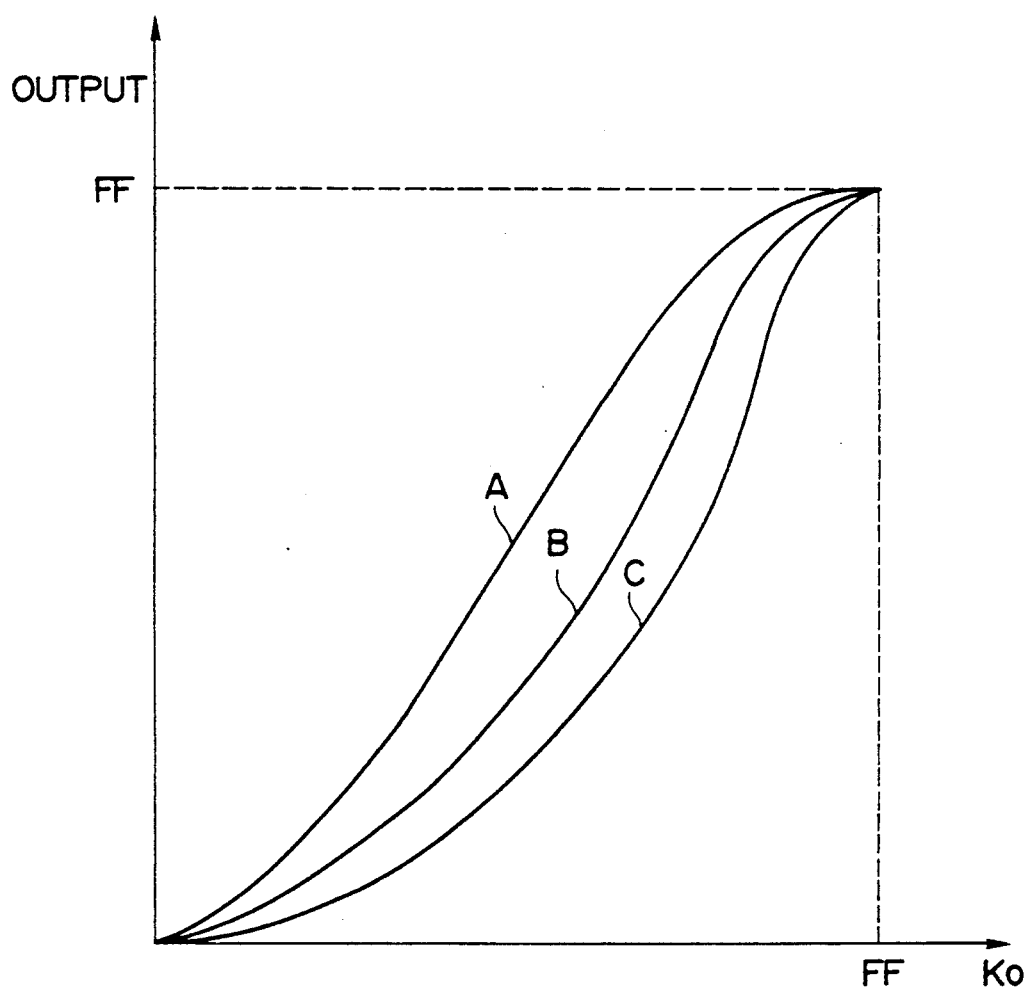
FIG. 9 is a graph showing UCR and inking cubic functions used in the second embodiment of the present invention.

Cubic function generators 31a to 31d comprise a ROM or the like. Each of the cubic function generators 31a to 31d stores a plurality of cubic functions $f=f(K_0)$ which pass two points (0,0) and $(FF_H, FF_M)$, as indicated by curves A, B, and C in FIG. 9 in response to an input $K_0$. One of the characteristic curves is selected in accordance with a selection signal (not shown). UCR operations are performed by subtractors 8a to 8c using the values of the selected cubic function. A gamma correction circuit 12d multiplies the value of the cubic function with the predetermined value $A_4$ to output the product as a black image signal.

The following conditions are required for the cubic function of this embodiment:

(1) A cubic function must pass two points (0,0) and (FF,FF); and (2) $df/dK_0$ value is linearly increased within the range of $0 < f \leq G$ ($0 < G \leq FF$).

Condition (1) is required to prevent saturation of the black components in a high-density portion. Condition (2) is required to prevent a decrease in saturation level in a low-density portion and generation of a pseudo edge.

Still another embodiment of the present invention will be described below.

Figure 10A:
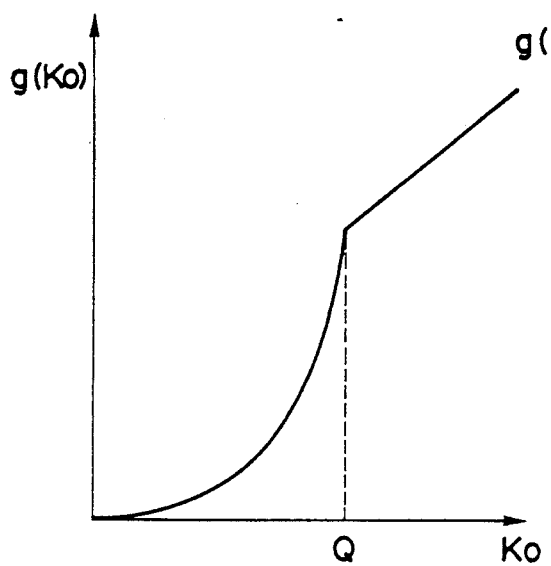
FIGS. 10A and 10B shows UCR and inking functions used in a third embodiment of the present invention.
Figure 10B:
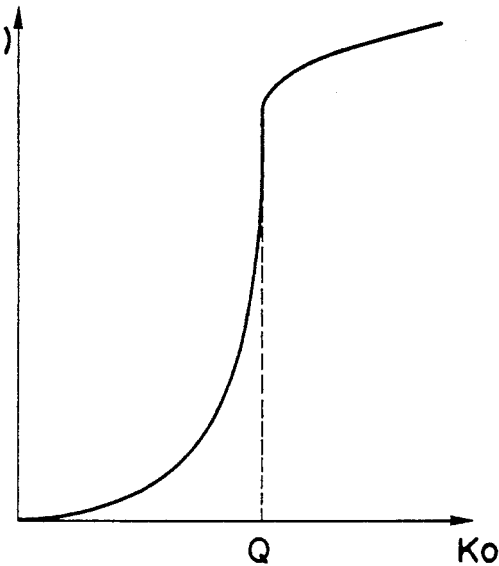

In a third embodiment, the cubic function generators 31a to 31d in FIG. 8 are replaced with a function generator for generating an arbitrary function $g(K_0)$. The function $g(K_0)$ must satisfy a condition that a $dg(K_0)/dK_0$ value linearly increases in the range of $0 < g \leq Q (0 < Q \leq FF)$. The quadratic functions of the first embodiment and the cubic functions of the second embodiment satisfy the above condition. If any function can satisfy this condition, it need not be expressed by a mathematical relation. Examples are given by a function in FIG. 10A or 10B. If the function $g(K_0)$ is given such that a $dg(K_0)/dK_0$ value linearly increases in the range $0 < q \leq Q'$ ($0 < QA$: A is a value smaller than FF), generation of the pseudo edge can be prevented and at the same time a total ink amount can reduced.

Figure 11:
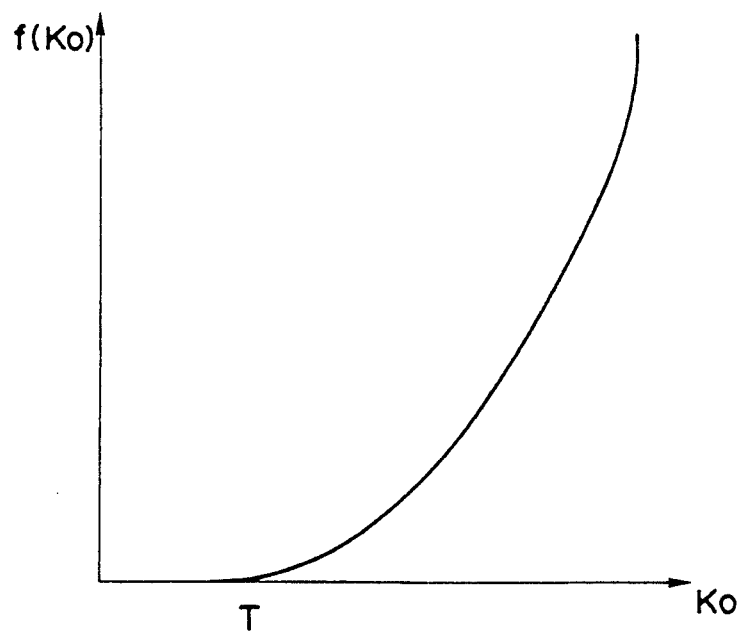
FIG. 11 is a graph showing a UCR and inking function of the present invention when an offset is given to the function.

In the above embodiment, the UCR and black signals pass point (0,0). However, these signals may be shifted to pass point (T,0) in FIG. 11.

In the above embodiment, black extraction and UCR are performed prior to masking after logarithmic conversion is completed. However, the present invention is not limited to this sequence. UCR may be performed after masking. In addition, both black extraction and UCR may be performed after masking.

In the embodiment of FIG. 8, if a back-print film is used in the same manner as in the embodiment of FIG. 1, the modes of operations of the gamma correction circuits 12a, 12b, and 12c or the cubic function generators 31a, 31b, 31c, and 31d may be changed to reduce a total ink amount.

In each of the embodiments described above, a serial scan printer using a multinozzle head shown in FIG. 5 is used. However, the present invention is not limited to this printer. A serial scan printer having a single nozzle, a printer having a full multihead, or a printer utilizing electrostatic process may be used. With such a printer, an amount of toner applied to a recording medium can be reduced, and offset (undesirable toner transfer) of the convey roller can be prevented, thereby performing beautiful full-color image recording. Stripes formed between scanning cycles can be prevented in a serial scan printer according to the present invention, and therefore an effect of the present invention can be maximized.

Figure 12A:
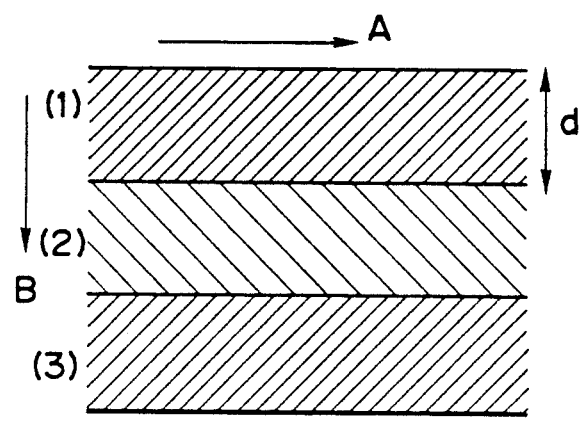
FIGS. 12A and 12B are views showing states in which images are printed by an ink-jet printer.
Figure 12B:
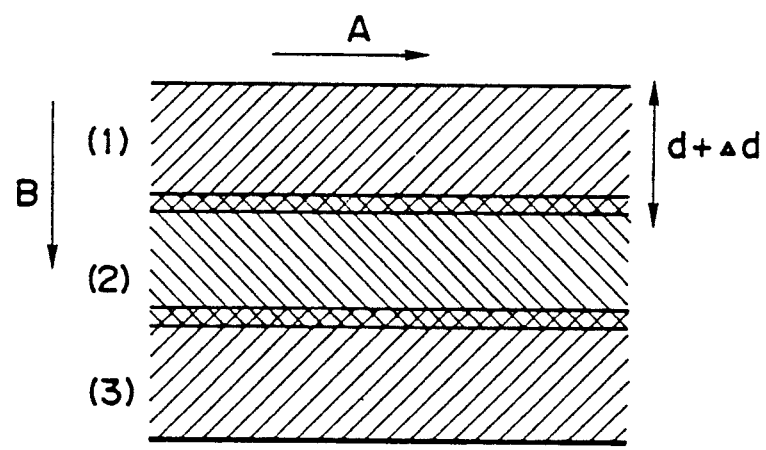

In a serial scan ink-jet printer for repeatedly recording an image every predetermined width by using a head having a width smaller than that of the image, stripes are undesirably formed in a high-density portion between scanning cycles. FIGS. 12A and 12B are views for explaining formation of stripes. More specifically, FIGS. 12A and 12B show recording patterns on a recording medium which are recorded by a serial scan ink-jet printer for performing image recording by repeating recording every width d in an order of (1), (2), and (3). The width d is determined by the number of nozzles and a recording density. If there are 256 nozzles and recording is performed at a density of 400 dpi, the width d is given as $256 < 25.4/400 = 16.256$ mm. FIG. 12A shows a case wherein printing is performed with one color and an amount of ink used is small. The ink can be sufficiently absorbed by the recording material, and the width of a printed image is almost equal to that of the recording width d. For this reason, when the recording head is scanned in the A direction after the recording head is scanned by d in the B direction, the stripes are not formed between the adjacent scanning cycles.

However, when image recording in a high-density portion is performed, the ink absorbing layer cannot satisfactorily absorb the recording ink, and the ink is spread in the vertical direction in FIG. 12B. Therefore, a printed image width becomes $d + \Delta d$.

In this case, if a scanning width of the recording head in the B direction is given as d, the adjacent images overlap by $\Delta d$, and this overlap portion appears as a black stripe. If the scanning width in the B direction is set to be $d + \Delta d$ in order to prevent this black stripe, a white stripe appears in a low-density portion. Therefore, an amount of ink used is very important in the serial scan printer.

According to the methods of the present invention, a total amount of ink injected to the recording medium can be reduced, and therefore formation of stripes between adjacent scanning cycles can be prevented.

The three color signals input to the image processor of the present invention may be supplied from an external device such as a memory or may be read by a reader having a CCD sensor or the like.

Figure 3:
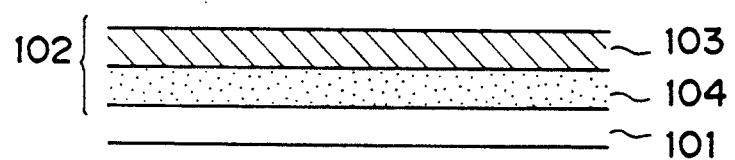
Figure 4:
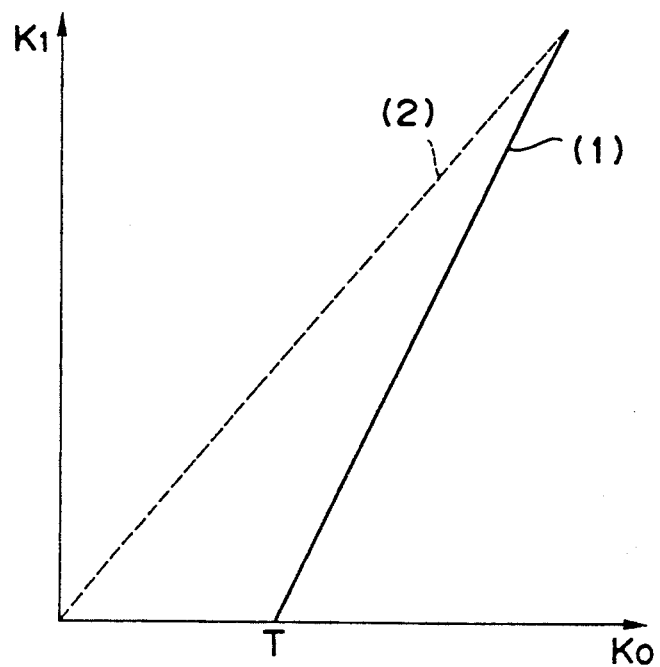
FIG. 4 is a graph showing an inking operation according to conventional image processing.

The recording medium according to the present invention is not limited to a two-layered structure (FIG. 2) consisting of a transparent substrate and an ink absorbing layer. As shown in FIG. 3, the recording medium may comprise a three-layered structure including an ink absorbing layer 102 which consists of an ink transporting layer 103 and an ink retaining layer 104. In this case, the injected ink can be strongly retained by the ink retaining layer, and an amount of ink left in the ink transporting layer is small. Therefore, an amount of ink in the inner surface of the transparent layer can be increased, thereby obtaining an image having a higher density.

The effect of the present invention can be maximized in the back-print film since an amount of ink retained by its ink retaining layer is relatively small.

In each of the above embodiments, subtractive primary (Y, M, and C) signals are obtained as the primary color signals. A minimum value is directly derived from the Y, M, and C signals as a value corresponding to the minimum value of the primary color signals. However, a maximum value of R, G, and B signals may be obtained as a value corresponding to the minimum value of the primary color signals. It is essential to obtain any value corresponding to the minimum value of the Y, M, and C signals.

According to the present invention as has been described above, when the primary color signals obtained by reading a color image are processed, a value transformed by a continuous function having a minimum peak in accordance with a value corresponding to the minimum value of the primary color signals is given as a color reproduction signal. Therefore, a decrease in saturation level in a low-density portion and generation of a pseudo edge can be prevented. Therefore, a good color image can be reproduced.

What is claimed is:

1. A method of processing a set of first color image signals to obtain a set of second color image signals, comprising the steps of:
    inputting a first, a second and a third primary color signals; and
    processing said input first, second and third primary color signals to obtain a first, a second, and a third color reproduction signals and a black reproduction signal,
    wherein said black reproduction signal is obtained by the steps of:
    determining a minimum value of said first, second, and third primary color signals; and
    changing the minimum value based on a continuous function (f) to obtain a transformed value, said continuous function (f) being a curve having a slope of which differentiation (df/dg) per variable g is not negative within a region $0 < g < G_3$, wherein $0 < G_3 < g_{MAX}$, said transformed value becoming said black reproduction signal.

2. A method according to claim 1, wherein said continuous function is a quadratic function.

3. A method according to claim 1, wherein said continuous function is a cubic function.

4. A method according to claim 1, further comprising the step of multiplying the value corresponding to the minimum value with a predetermined coefficient during transformation by said continuous function, thereby obtaining said black reproduction signal.

5. A method according to claim 1, wherein said first, second and third primary color signals are R, G, and B signals.

6. A method according to claim 1, wherein said continuous function is a function passing an origin.

7. A method according to claim 1, wherein said reproduction signals are those in an ink-jet recording system.

8. A method according to claim 1, wherein said reproduction signals are those in recording on a back-print film by using an ink-jet recording system.

9. A method according to claim 1, further comprising the step of:
    subtracting said transformed value from said first, said second and said third primary color signals to output a first, a second and a third primary color reproduction signal.

10. A method of processing a set of first color image signals to obtain a set of second color image signals, comprising the steps of:
    inputting a first, a second and a third primary color signals;
    processing said input first, second and third primary color signals to obtain a first, a second, and a third color reproduction signals and a black reproduction signal, said processing being carried out by the steps of;
    determining a minimum value $K_0$ of said first, said second, and said third primary color signals;
    determining a first function value $f_1(K_0)$ and a second function value $f_2(K_0)$ corresponding to said minimum value $K_0$; and
    subtracting the function value $f_1(K_0)$ from said first, second and third primary color signals to obtain values for said first, said second and said third color reproduction signals and making a value of said black reproduction signal the function value $f_2(K_0)$, wherein a differential value $df_1(K_0)/dK_0$ and a differential value $df_2(K_0)/dK_0$ of said function values $f_1(K_0)$ and $f_2(K_0)$ linearly increase within a range of $0<f_1\leq G_1$ and a range of $0<f_2\leq G_2$ ($0<G_1\leq f_{1MAX}$, and $0<G_2\leq f_{2MAX}$).

11. A method according to claim 10, wherein said function values $f_1(K_0)$ and $f_2(K_0)$ are represented by quadratic functions, respectively.

12. A method according to claim 10, wherein said function values $f_1(K_0)$ and $f_2(K_0)$ are represented by cubic functions, respectively.

13. A method according to claim 10, wherein said first, second and third primary color signals are Y, M and C signals.

14. A method according to claim 10, wherein said reproduction signals are those in an ink-jet recording system.

15. A method according to claim 10, wherein said reproduction signals are those used in recording on a back-print film by using an ink-jet recording system.

16. An apparatus for processing a set of first color image signals to obtain a set of second color image signals, comprising:
 inputting means for inputting a first, a second and a third primary color signals;
 processing means for processing said input first, second and third primary color signals to obtain a first, a second, and a third color reproduction signals and a black reproduction signal, said processing means comprising;
 determining means for determining a minimum value of said first, second and third primary color signals;
 transforming means for transforming said minimum value based on a continuous function (f) to obtain a transformed value, said continuous function (f) being a curve having a slope of which differentiation (df/dg) per variable g is not negative within a region $0<g<G_3$, wherein $0<G_3<g_{MAX}$; and
 black-reproduction signal defining means for making a value of said black reproduction signal equal to said transformed value.

17. An apparatus according to claim 16, wherein said continuous function is a quadratic function.

18. An apparatus according to claim 16, wherein said continuous function is a cubic function.

19. An apparatus according to claim 16, further comprising:
 e) means for subtracting said transformed value from said first, second and third primary color signals;

20. An apparatus according to claim 16, wherein said apparatus reproduces the color image signals by ink-jet recording.

21. An apparatus according to claim 16, wherein said apparatus reproduces the color image signals by a serial scan system.

22. An apparatus according to claim 20, wherein said apparatus reproduces the color image signals on a back-print film by ink-jet recording.

23. An apparatus according to claim 16, further comprising:
 subtracting means for subtracting said transformed value from said first, said second and said third primary color signals, to output a first, a second and a third primary color reproduction signal.

24. A color image processing apparatus, for processing a set of first color image signals to obtain a set of second color image signals, comprising:
 inputting means for inputting a first, a second and a third primary color signals;
 processing means for processing said input first, second and third primary color signals to obtain a first, a second, and a third color reproduction signals and a black reproduction signal, said processing means comprising;
 determining means for determining a minimum value $K_0$ of said first, said second, and said third input color signals;
 selecting means for selecting a first function value $f_1(K_0)$ and a second function value $f_2(K_0)$ corresponding to said minimum value $K_0$; and
 generating means for generating said first, said second, and said third color reproduction signals by subtracting the first function value $f_1(K_0)$ from said first, second and third color signals, said generating means also making a value of said black reproduction signal the same as the second function value $f_2(K_0)$;
 wherein a differential value of $df_1(K_0)/dk_0$ and a differential value $df_2(K_0)/dK_0$ of the function values $f_1(K_0)$ and $f_2(K_0)$ increase linearly within a range of $0<f_1\leq G_1$, and a range of $0<f_2\leq G_2$, wherein $0<G_1\leq f_{1MAX}$, and $0<G_2\leq f_{2MAX}$.

25. An apparatus according to claim 24, wherein the function values $f_1(K_0)$ and $f_2(K_0)$ are both represented by quadratic functions.

26. An apparatus according to claim 24, wherein the function values $f_1(K_0)$ and $f_{h2}(K_0)$ are both represented by cubic functions.

27. An apparatus according to claim 24, wherein said three color signals are Y, M and C signals.

28. An apparatus according to claim 24, wherein the reproduction signals are those in an ink-jet recording system.

29. An apparatus according to claim 24, wherein said reproduction signals are those used in recording on a back-print film by using an ink-jet recording system.

30. A method of processing a set of first color image signals to obtain a set of second color image signals, comprising the steps of:
 inputting said set of first color image signals
 processing said set of first color image signals to obtain said set of second color image signals including a first, a second and a third color reproduction signals and a black reproduction signal,
 wherein a value of said black reproduction signal corresponds to a transformed value;
 determining a minimum value of said first, said second and said third primary color signals; and
 changing the minimum value based on a continuous function (f) to obtain said transformed value, said continuous function (f) being a curve having a slope of which differentiation (df/dg) per variable g is not negative within a region $0<g<G_3$, wherein $0<G_3<g_{MAX}$.

31. A method according to claim 30, wherein said continuous function is a quadratic function.

32. A method according to claim 30, wherein said continuous function is a cubic function.

33. A method according to claim 30, further comprising the step of multiplying the value corresponding to the minimum value with a predetermined coefficient during transformation by said continuous function, thereby obtaining said black reproduction signal.

34. A method according to claim 30, wherein said three primary signals are R, G and B signals.

35. A method according to claim 30, wherein said continuous function passes through an origin.

36. A method according to claim 30, wherein said reproduction signals are those in an ink jet recording system.

37. A method according to claim 30, wherein said reproduction signals are those in recording on a backprint film by using an ink jet system.

38. A method according to claim 30, further comprising the step of:

subtracting said transformed value from said first, said second and said third primary color signals to output a first, a second and a third primary color reproduction signal.

39. An apparatus for processing a set of first color image signals to obtain a set of second color image signals, comprising:

inputting means for inputting said set of first color image signals;

processing means for processing said set of first color image signals to obtain said set of second color image signals including a first, a second and a third color reproduction signals and a black reproduction signal, wherein a value of said black reproduction signal corresponds to a transformed value, said processing means comprising;

determining means for determining a minimum value of said first, said second and said third primary color signals; and changing means for changing the minimum value based on a continuous function (f) to obtain said transformed value, said continuous function (f) being a curve having a slope of which differentiation (df/dg) per variable g is not negative within a region $0 < g < G_3$, wherein $0 < G_3 < g_{MAX}$.

* * * * *

UNITED STATES PATENT AND TRADEMARK OFFICE
CERTIFICATE OF CORRECTION

PATENT NO. : 5,172,223
DATED : December 15, 1992
INVENTOR(S) : AKIO SUZUKI, ET AL.

It is certified that error appears in the above-identified patent and that said Letters Patent is hereby corrected as shown below:

COLUMN 1

Line 8, "INVENTION:" should read --INVENTION--.
Line 49, "L abscissa When" should read --abscissa.  When--.

COLUMN 2

Line 52, "shows" should read --show--.

COLUMN 6

Line 1, "$df/dK_0$" should read --A $df/dK_0$--.

COLUMN 8

Line 57, "of;" should read --of:--.

COLUMN 9

Line 4, "O<" should read --O<-- (both occurrences).
Line 5, "O<" should read --O<-- (both occurrences).
Line 31, "comprising;" should read --comprising:--.
Line 40, "O<" should read --O<-- (both occurrences).

COLUMN 10

Line 10, "comprising;" should read --comprising:--.
Line 24, "$df_1(K_0)/dk_0$" should read --$df_1(K_0)/dK_0$--.
Line 27, "O<" should read --O<-- (both occurrences).
Line 28, "O<" should read --O<-- (both occurrences).

UNITED STATES PATENT AND TRADEMARK OFFICE
CERTIFICATE OF CORRECTION

PATENT NO. : 5,172,223
DATED : December 15, 1992
INVENTOR(S) : AKIO SUZUKI, ET AL.

Page 2 of 2

It is certified that error appears in the above-identified patent and that said Letters Patent is hereby corrected as shown below:

COLUMN 10 (con't)

Line 33, "$f_{h2}(K_0)$" should read --$f_2(K_0)$--.
Line 37, "the" should read --said--.
Line 47, "signals" should read --signals;--.

Signed and Sealed this

Twenty-fifth Day of January, 1994

Attest:

BRUCE LEHMAN

Attesting Officer    Commissioner of Patents and Trademarks